(12) United States Patent
Yates et al.

(10) Patent No.: US 7,127,388 B2
(45) Date of Patent: *Oct. 24, 2006

(54) INTERFACES FOR AN OPEN SYSTEMS SERVER PROVIDING TAPE DRIVE EMULATION

(75) Inventors: Neville Yates, Los Gatos, CA (US); Jeffrey Miller, Menlo Park, CA (US); Touraj Boussina, San Carlos, CA (US); Allen Harano, San Jose, CA (US)

(73) Assignee: Advanced Digital Information Corporation, Redmond, WA (US)

( * ) Notice: Subject to any disclaimer, the term of this patent is extended or adjusted under 35 U.S.C. 154(b) by 893 days.

This patent is subject to a terminal disclaimer.

(21) Appl. No.: 10/291,193

(22) Filed: Nov. 8, 2002

(65) Prior Publication Data

US 2003/0120476 A1 Jun. 26, 2003

Related U.S. Application Data

(63) Continuation of application No. 09/111,691, filed on Jul. 8, 1998.

(60) Provisional application No. 60/052,055, filed on Jul. 9, 1997.

(51) Int. Cl.
*G06F 9/455* (2006.01)
*G06F 3/00* (2006.01)
*G06F 13/10* (2006.01)
*G06F 15/16* (2006.01)
*G06F 15/167* (2006.01)

(52) U.S. Cl. ............... 703/24; 718/1; 719/324; 719/325; 719/326; 703/21; 703/25; 709/213; 709/214; 709/215; 711/203; 711/209; 711/111; 711/112

(58) Field of Classification Search .......... 703/24; 718/1
See application file for complete search history.

(56) References Cited

U.S. PATENT DOCUMENTS

| 4,310,883 | A | * | 1/1982 | Clifton et al. ............. 707/205 |
| 4,467,421 | A | * | 8/1984 | White ..................... 711/118 |
| 4,727,512 | A | * | 2/1988 | Birkner et al. .............. 703/24 |
| 4,775,969 | A | * | 10/1988 | Osterlund ................ 369/53.1 |
| 4,945,429 | A | | 7/1990 | Munro et al. |
| 5,018,060 | A | | 5/1991 | Gelb et al. |
| 5,127,094 | A | * | 6/1992 | Bono .......................... 711/2 |
| 5,129,088 | A | | 7/1992 | Auslander et al. |
| 5,193,184 | A | * | 3/1993 | Belsan et al. ................ 711/4 |
| 5,210,866 | A | | 5/1993 | Milligan et al. |
| 5,239,647 | A | | 8/1993 | Anglin et al. |
| 5,287,459 | A | | 2/1994 | Gniewek |
| 5,297,124 | A | * | 3/1994 | Plotkin et al. .............. 360/49 |
| 5,335,329 | A | | 8/1994 | Cox et al. |
| 5,403,639 | A | | 4/1995 | Belsan et al. |
| 5,416,914 | A | | 5/1995 | Korngiebel et al. |
| 5,435,004 | A | | 7/1995 | Cox et al. |
| 5,438,674 | A | * | 8/1995 | Keele et al. ................. 711/4 |
| 5,440,686 | A | | 8/1995 | Dahman et al. |
| 5,446,848 | A | | 8/1995 | Whitlock et al. |
| 5,455,926 | A | * | 10/1995 | Keele et al. ................. 711/4 |
| 5,485,321 | A | | 1/1996 | Leonhardt et al. |

(Continued)

*Primary Examiner*—Kamini Shah
*Assistant Examiner*—Shambhavi Patel
(74) *Attorney, Agent, or Firm*—Perkins Coie LLP

(57) ABSTRACT

An improved interface between a host computer and a tape drive emulation system includes software interfaces for communicating control, configuration, and policy data and a hardware interface for providing redundancy and fan-out between the main controller and host channels.

7 Claims, 7 Drawing Sheets

U.S. PATENT DOCUMENTS

| | | | |
|---|---|---|---|
| 5,487,171 A * | 1/1996 | Dodt et al. | 710/20 |
| 5,506,986 A | 4/1996 | Healey | |
| 5,546,557 A * | 8/1996 | Allen et al. | 711/111 |
| 5,613,154 A * | 3/1997 | Burke et al. | 710/1 |
| 5,671,400 A | 9/1997 | Kiggens et al. | |
| 5,761,445 A | 6/1998 | Nguyen | |
| 5,761,503 A * | 6/1998 | Fisher | 707/104.1 |
| 5,805,864 A * | 9/1998 | Carlson et al. | 703/24 |
| 5,809,511 A * | 9/1998 | Peake | 707/204 |
| 5,867,648 A | 2/1999 | Foth et al. | |
| 5,870,732 A * | 2/1999 | Fisher et al. | 707/1 |
| 5,897,661 A | 4/1999 | Baranovsky et al. | |
| 5,926,834 A | 7/1999 | Carlson et al. | |
| 6,067,599 A | 5/2000 | Kishi et al. | |
| 6,496,791 B1 * | 12/2002 | Yates et al. | 703/25 |

* cited by examiner

INTERFACES FOR AN OPEN SYSTEMS SERVER PROVIDING TAPE DRIVE EMULATION

CROSS-REFERENCE TO RELATED APPLICATIONS

This application is a continuation of U.S. patent application Ser. No. 09/111,691, filed on Jul. 8, 1998, which claims priority from U.S. Provisional Application No. 60/052,055, filed Jul. 9, 1997, both of which are incorporated herein by reference in their entirety for all purposes.

BACKGROUND OF THE INVENTION

The present invention relates generally to data storage systems and more particularly relates to tape drive emulation (TDE) systems.

Many data processing systems utilize tape drives for storage of data. Channel interfaces and commands generated by a data source to control the transfer of data from a host computer to a tape drive are well-known in the art and will not be described in detail here. One example of an operating system for managing data transfer between a host computer and a tape drive is the MVS system manufacture by IBM Corporation.

In a tape drive emulation system, the data output by the host is not actually written to a tape drive and data input by host is not actually read from a tape drive. Instead, in one type of TDE system, the data is input from and output to staging disks.

SUMMARY OF THE INVENTION

According to one aspect of the invention, an improved interface facilitates communication between a library management system (LMS), operating on a host computer, and an Open Systems Server (OSS) containing virtual tape drives (VTDs) and operating as a TDE system.

According to another aspect of the invention, the interface supports two different kinds of communications. One type is a dump of a large amount of data that is not suitable to real-time short transactions. In this case, the data to be provided to the LMS is packaged in a virtual volume with a special name convention. Such a special virtual volume is called an "administrative volume." Periodically, the LMS requests an administrative volume, the OSS "mounts" the volume on a VTD, and the LMS reads the wanted information from the VTD. Thus, the administrative volume is used to communicate status, control, and configuration information between the LMS in the host and OSS, using a standard access method (tape or virtual tape).

According to another aspect of the invention, the interface utilizes load display (LD) commands. LD commends are channel commands normally used to route messages to a tape drive's operator display accessory. The present invention utilities LD commands to communicate policy and control information messages to the TDE system and to monitor its condition. Policy information reflects decisions by the user(s) and includes rules and preferences for the handling and disposition of data written to VTDs. These user decisions are unknown to OSS, but are communicated to the LMS in the host, and guide LMS in its operation. For example, the assignment by LMS of particular data to a virtual volume belonging to a virtual volume set (VSET) with which a collection of pre-programmed handling rules is associated is an expression of policy. The virtual volumes need a large amount of policy info for management.

According to another aspect of the invention, the SBUS card slots are expanded to facilitate the use of a SPARC CPU to control a mass storage system.

According to another aspect, a special "Health Check" LD message is periodically sent. If a critical situation exists within OSS, a special error message will be generated and delivered to the operator by LMS.

According to another aspect of the invention, SBUSs of two SPARC CPUs are connected to each ESCON interface for redundancy.

Additional features and advantages of the invention will be apparent in view of the following detailed description and appended drawings.

DETAILED DESCRIPTION OF THE PREFERRED EMBODIMENTS

Figure 1A:
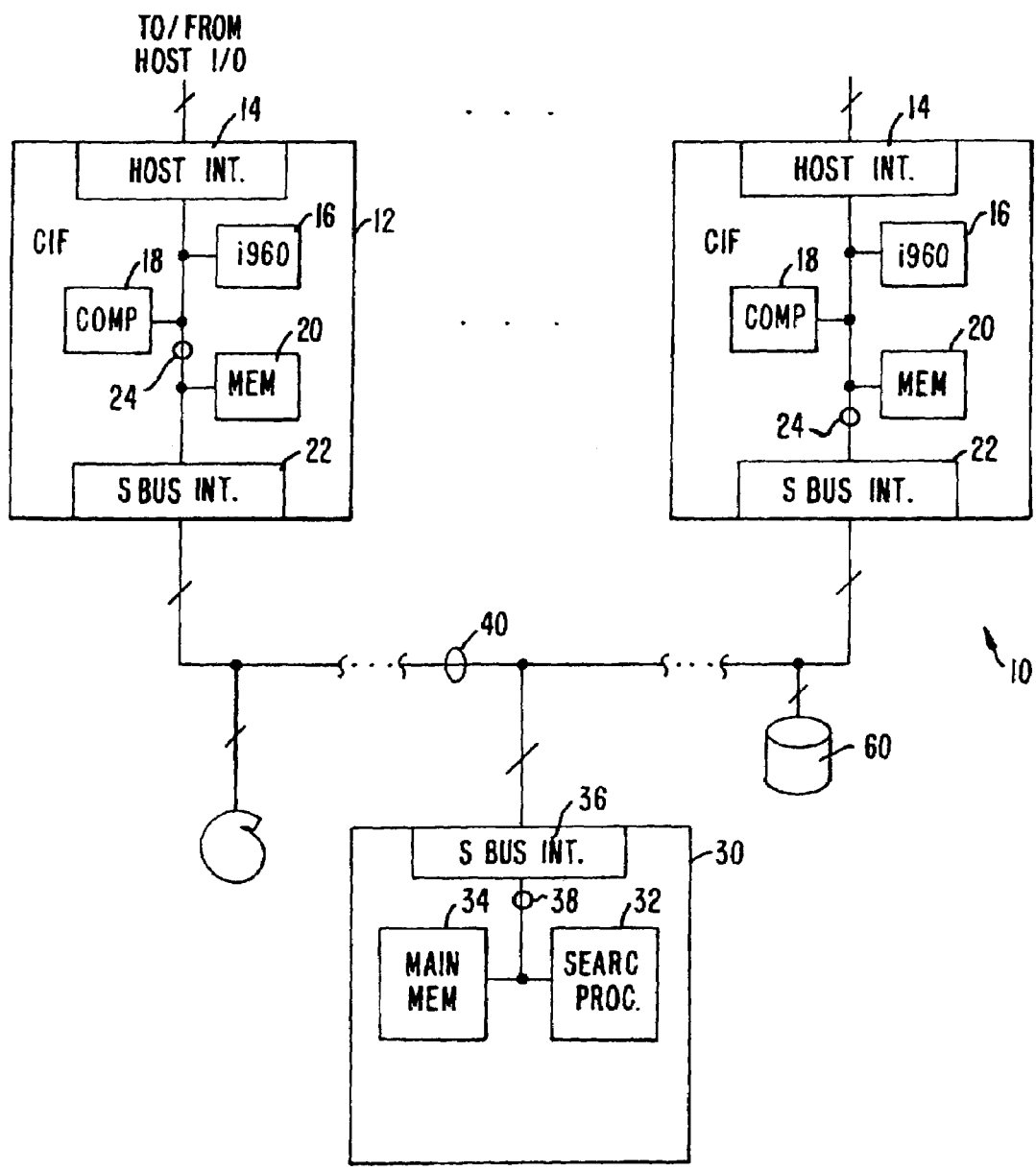
FIG. 1A is a block diagram of a preferred embodiment of the invention.

A preferred embodiment will now be described with reference to the figures, where like or similar elements are designated with the same reference numerals throughout the several views. FIG. 1A is a high level block diagram of a part of a tape drive emulation (TDE) system 10, also referred to herein as OSS 10, utilizing an embodiment of the present invention.

A plurality of channel interfaces (CIFs) 12 are coupled to host I/O channels (not shown) to transfer data between the host and the TDE system.

Each CIF 12 includes a host interface 14, an embedded controller 16, a data formatter 18 for performing data compression and other functions, an SBUS interface 22, a buffer memory 20, and an internal bus 24. In the preferred embodiment, the embedded processor 16 is a model i960 manufactured by Intel Corporation.

The main controller 30 includes a main processor 32, main memory 34, an SBUS interface 36, and an internal bus 38. In the preferred embodiment, the main processor is a SPARC computer manufactured by Sun Microsystems Incorporated. The CIFs 12 and main controller 30 are coupled by a system bus (Sbus) 40.

The tape drive emulation (TDE) system 10 stores host data on "virtual tape drives." In one preferred embodiment, the data is actually stored on staging disks. Because the TDE system 10 must interact with the host as if the data were actually stored on tape drives, a data structure called a virtual tape drive (VTD) is maintained in main memory 34 for each virtual tape drive. Each VTD contains all information about the state of the associated virtual tape drive.

Figure 1B:
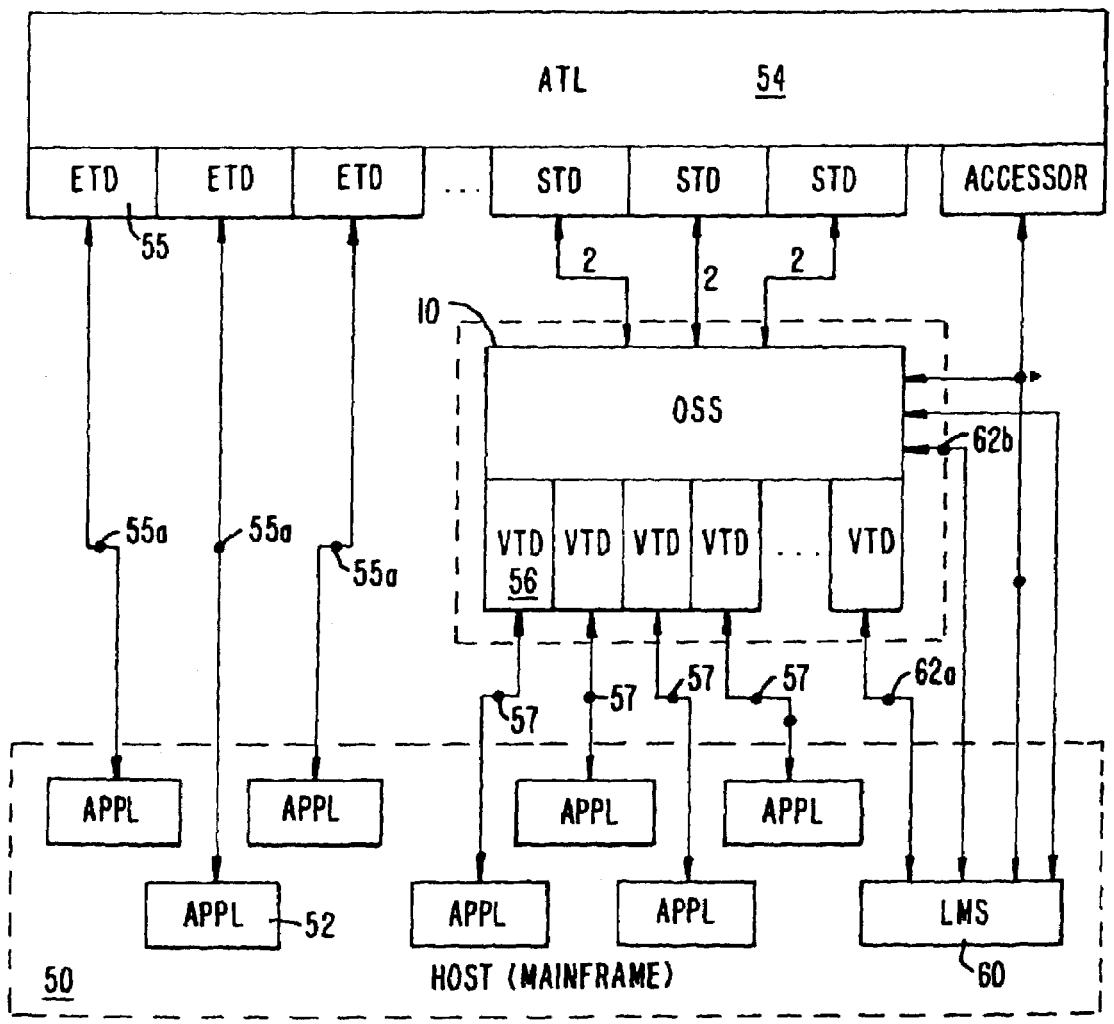
FIG. 1B is a block diagram of a data storage system including a TDE system.

FIG. 1B is a high-level block diagram of a system in which a preferred embodiment of the invention is utilized. In FIG. 1B, a host computer 50, for example an IBM mainframe computer, executes a plurality of applications 52.

In practice, the host computer 50 is typically running the MVS operating system manufactured by IBM. MVS provides the applications with I/O services, including I/O to an automatic tape library (ATL) 54. The physical interface between the applications 52 and ESCON tape drives 55 is the ESCON 3490 magnetic tape subsystem interface 55*a*. MVS, the ESCON interface 55*a*, and the host computer 50 are well-known and not a part of the present invention.

The preferred embodiment of tape drive emulation (TDE) system 10, designated OSS 10 (open systems server), is manufactured by the assignee of the present invention. OSS 10 maintains virtual tape drives 56 (VTDs) which emulate the physical ETDs 55. More details of the VTDs 56 will be presented below. The interface between an application 52 and a VTD 56 is the OSS Emulated Device interface 57.

A library management system (LMS) software module 60 resides on the host 50 and provides services to MVS and OSS. LMS 60 is responsible for management of the tape library environment and performs such tasks as fetching and loading cartridges into drives, returning unloaded cartridges to their home locations, etc. The interface between LMS 60 and OSS 10 is the library manager interface, with paths 62*a* and 62*b* based on two distinct protocols.

The VTD 56 is a non-physical device that responds as if it were a real device. In the currently described embodiment, the emulated physical device is an IBM-3490 tape drive. The VTD 56 responds to commands issued on a channel in the same fashion as the emulated technology.

Host data is stored in volumes. A virtual volume is a collection of data and metadata that, taken together, emulate a real tape volume. When "mounted" on a VTD, these virtual volumes are indistinguishable from real tape volumes by the host computer.

In this context "data" refers to data output by the host to be stored on tape and "metadata" refers to information generated by OSS which permits the emulation of real tape drives and volumes.

An example will help clarify the meaning of the terms. If a host application intends to write data to tape, it requests that a tape be mounted on a tape drive. LMS intercepts the request and causes a virtual volume to be mounted on a virtual tape drive to receive the application output, which is delivered by the ordinary tape output programs of the operating system. Blocks of data received by OSS are "packetized," the packets are grouped together in clusters with a fixed maximum size, called "extents," and the extents are written to staging disks. Often the extents containing data from one virtual tape are scattered over several disk drives. All information about the packetization, such as packet grouping in extents and extent storage locations, required to reassemble the volume for later use by the host is metadata. Part of the metadata is stored with each extent and part is stored on non-volatile in OSS, separate from the extent storage.

LMS requires information concerning the contents of OSS to properly respond to host requests for accessing VTDs and virtual volumes. It also needs information on OSS storage space usage to manage auxiliary operations which maintain enough free space to adequately receive new outputs. In the present embodiment, there are two primary interfaces for transferring information between LMS and OSS. In the discussion below, an interface means a protocol or style of interaction between LMS and OSS, not necessarily its physical implementation.

Figure 2:
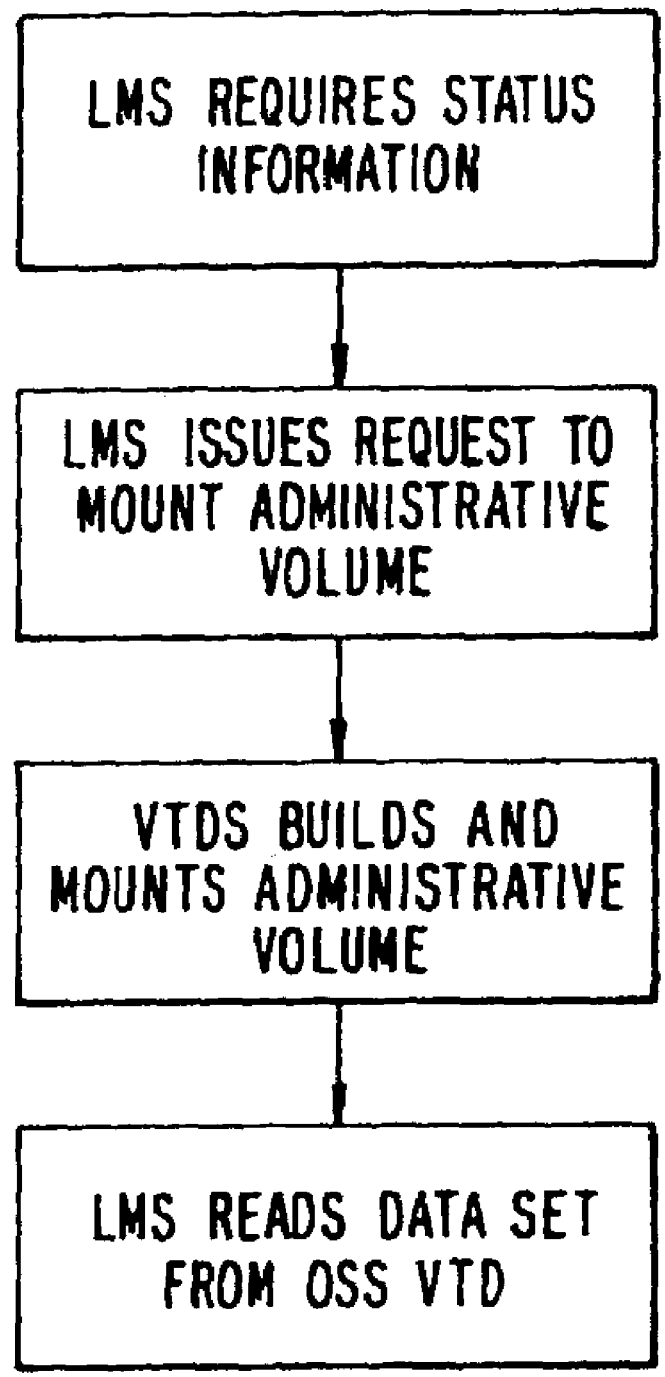
FIG. 2 is a flow-chart describing the steps of mounting an administrative volume.

The first interface to be described is the administrative volume interface, which is used to access a large volume of information during a single transaction. This type of information relates to complete and detailed status of the virtual library in OSS and includes more information than can be rapidly transferred using short messages. The high level description of the function of the administrative volume interface will now be presented with reference to FIG. 2.

When LMS requires information describing the status and contents of OSS, it uses the conventional facilities of the operating system to allocate a VTD and request the mounting of an administrative volume. For example, it is necessary to periodically synchronize status and content information of OSS with information in the tape management component in use by the operating system. Utilities in LMS implement this synchronization.

A special naming convention for the administrative volumes allows OSS to interpret the mount command as a request for a particular body of status information. Different names specify different types of administrative volumes.

These administrative volumes appear to host applications as ordinary volumes with IBM standard labels. According to a convention used in the preferred embodiment, their volume serial numbers, the names by which they are known in host indexes of tapes and which are written on the tapes in the VOL1 labels, are generated by adding a single character to a specified five character prefix, reserved to the exclusive use of LMS.

In the currently described embodiment, there are five types of administrative volumes defined: Audit List; Audit List Discrepancies; Audit List Agreement; RAID Status Report; and OSS Data Dump. Presently, only read-only administrative volumes, i.e., administrative volumes transferring information from OSS to LMS, are implemented. Each volume contains labels and one data set.

The "Audit List" data set contains a volume status record for each volume known to the OSS. This data set is a read-only data set produced by the OSS when the appropriate administrative volume is mounted.

The "Audit List Discrepancies" data set also contains volume status records. It is a write-only data set and will contain a volume status record for every volume on which a host's tape management system component and OSS differ on volume status.

The "Audit List Agreement" data set also contains volume status records. It is a write-only data set, and will contain a volume status record for every volume on which the tape management system component and the OSS agree on volume status.

The "RAID Status Report" data set contains a virtual volume set (VSET) usage record for each VSET known to OSS, a free space record for each RAID region and a single OSS system status record. This data set is a read-only data set produced by the OSS when the appropriate administrative volume is mounted.

Information in the "OSS Data Dump" data set will contain raw data that the OSS wishes to communicate to a host application. This data set is a read-only data set produced by the OSS when the appropriate administrative volume is mounted.

In response to the host's mount request for an administrative volume containing a read-only data set, OSS builds an administrative data set from status information stored in its data base. The type of information included in the administrative data set depends on the name (the volume serial number) included in the mount command.

When OSS has completed building the administrative data set and storing it on disks in the usual way for storage of OSS virtual volumes, it signals LMS that the administrative volume is mounted. LMS then reads the administrative data set to obtain the requested status information.

Thus, standard channel commands are utilized to transfer status information between OSS and LMS in an efficient manner.

The above-described administrative volume interface provides a unique mechanism to transfer large volumes of status, control, and configuration information between OSS and LMS. Such information is required in a TDE system to permit effective management and operation of the TDE system by the LMS.

Another type of information unique to a TDE system is termed "policy" information. In one type of OSS, virtual volume data transferred between the host is staged on disk drives. Additionally, tape drives (the SCSI tape drives of FIG. 1) are also included and virtual volumes may be destaged from the disk drives to the tape drives.

The majority of optimizations available to tailor an OSS to particular customer's requirements come from optimization of timing of various events in the life-cycle of a virtual volume. These optimizations take the form of choices among various policies defined below.

The task of managing policy decisions is simplified by grouping attributes of virtual volumes as follows:
- those attributes which specify the kind of medium being emulated;
- those attributes which guide the choice of long term storage media for data associated with the virtual volume; and
- those attributes that direct the timing of data residency as it passes through the OSS staging disks.

Several examples of policies associated with a virtual volume are the performance class, media class, and storage class.

The performance class specifies the attributes of a virtual volume that govern residency timing of the data of the virtual volume on various media. It is called performance class because altering the class changes user-perceived performance, most notably mount delay.

The media class describes the attributes of a single kind of media emulated by OSS, i.e., attributes such as technology type, media geometry, etc. Media classes are defined by the user and associated with a virtual volume at the time of its creation. An example of media class might be "3490-CST," defined as 550 foot, 3490 EDRC tapes.

The storage class is a description of whether data is replicated, and how data is stored in OSS. A storage class is associated with a virtual volume at the time of its creation, and may be changed at any time that a volume is mounted as an output-only volume. Storage classes are defined by the user. An example of a storage class might be "VAULTED" defined to direct the data for a virtual data to a single stacked image and single native image, with the intent that the native image will be stored offsite.

As these examples show, policy information must be communicated to OSS in real time, for example when a virtual volume is created or mounted. In the present embodiment, policy information is communicated by unconventional use of the standard load display interface (LDI).

"Load Display" is a command issued to a 3490 tape drive which transmits an associated message, part of which is to be displayed on a display pod associated with the tape drive. In an IBM 3490, the messages do not affect the operation of the tape drive, but were intended to communicate with a human operator. With the advent of automatic tape libraries the LDI has become a vestigial communication channel. In the present invention, the LDI is used to communicate policy information to the OSS from the LMS in real time.

A load display command transfers sixteen bytes of information, viewed as a message. The format utilized in the currently described embodiment includes a first byte set to identify the message as an LMS to OSS communication, a second to identify a particular request, thirteen bytes of request specific data, a check sum byte (XOR of all preceding bytes), and a byte specifying the data length. The LDI messages are not intended to be displayed.

In the currently described embodiment, the LMS library driver uses the LDI to request these services: mountVirtualScratch( ); MountVirtualVolume( ); keepVirtualVolume( ); updateVolumeStatus( ); healthCheck( ); timeStamp( ); stageVirtualVolume; destageVirtualVolume( ); and reuseSpace( ).

The mountVirtualScratch( ) request, for example, specifies a VSET Name in thirteen bytes of the message. Responding to the request, OSS mounts a volume it chooses from a pool of volumes whose names are within a name range allocated to the VSET and whose present status is "scratch," meaning not in use, containing only a label. The volume so mounted takes on the media, performance and storage class attributes associated with the VSET as defaults. Subsequent LDI requests naming the chosen volume may be used to alter certain of the attributes.

The LDI is, by its nature, a one way communication channel: it was designed for the host computer to send display messages to operators. However, one type of LDI message supported by the present embodiment, the health check, is an example of the use of the LDI for information gathering rather than expressing policy or requesting action. The healthCheck( ) message format is sent from LMS as a poll request to determine the operational status of the OSS.

In critical situations the OSS must inform LMS and/or the operator that an event has occurred. These events are currently associated with RAID space shortage and equipment failures.

The LDI healthCheck( ) poll message is issued to the OSS on a regular basis, e.g., every 30 seconds. The healthCheck( ) message contains a host system identifier and the date and time. If an error condition exists in OSS, the OSS ends the execution of the load display command with command-failure status (unit check). The host reacts to unit check by reading sense bytes from the OSS and OSS includes in these a distinctive "SUU ERP code" (X'42'). The "EC level" byte in the sense data contains the OSS system error code, an unsigned, 8-bit number indicating the highest priority error existing at the time. The OSS continues to respond to subsequent healthCheck( ) polls until the malfunction or other emergency is resolved (or goes away).

The MVS operating system produces a LOGREC record and an IOS000I message for each SUU response but retries the failing I/O. OSS, recognizing the retry, allows the command to complete without error. LMS intercepts the MVS IOS000I message, deletes it, informs the operator of the error condition, and then takes appropriate action.

An additional requirement of OSS is to provide multiple channel interfaces to a host or multiple hosts. The controller utilized in the currently preferred embodiment is based on a SPARC processor manufactured by SUN Microsystems.

A special interface has been designed to expand the standard interface provided with the SPARC computer.

Additionally, redundancy is built into the interface to assure the reliability required of a tape storage system.

Figure 3:
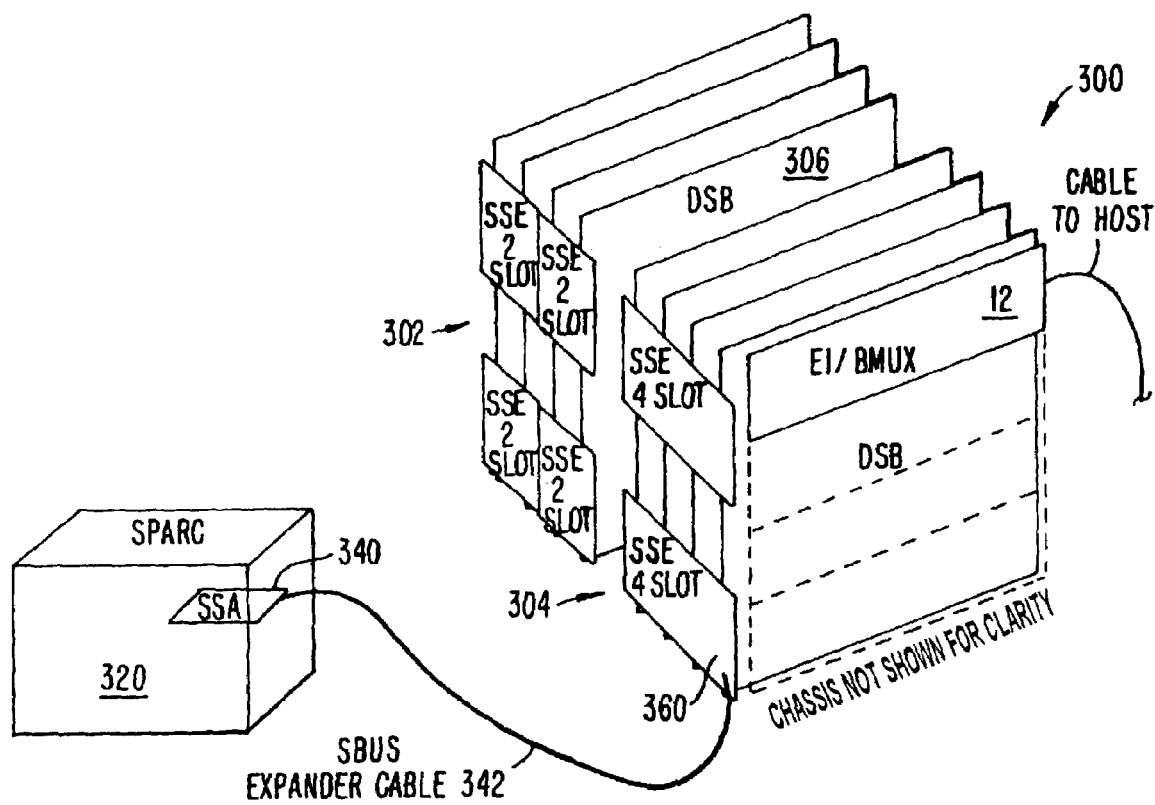
FIG. 3 is a perspective view of the channel interface hardware.

FIG. 3 is a high-level schematic diagram showing the redundant, channel interface expansion chassis hardware 300. The CIF interface cards 12 reside in the expansion chassis 300. The chassis is divided into two halves 302 and 304. Electrically, each half is separately powered and contains its own separate sets of SBus connections. Each half can contain up to four dual SBus base (DSB) boards 306, each of which can contain up to four channel interfaces 12 (in this embodiment ESCON interface (EI) or block multiplexer interface (BMUX) daughter cards) for a total of sixteen interfaces per half. Unless otherwise specified, the term "chassis" in the following refers to a chassis half.

Each connection to the main processor(s) 320 is made via an SBus expander, consisting of an SBus adapter (SSA) 340 that plugs into an SBus slot inside the SPARC, an interconnecting cable 342, an SBus expander (SSE) 360, which connects to either two or four slots in the chassis. Each slot in the chassis can connect to two SSEs 360 via identical connectors. If each SSE is connected to four slots, then two separate SBus connections to SPARC(s) are provided for that chassis. If each SSE is connected to two slots, then each pair of slots contains connections to two SBuses, for a total of four separate SBuses per chassis [half], and a system total of eight SBus connections to SPARCs.

Figure 4:
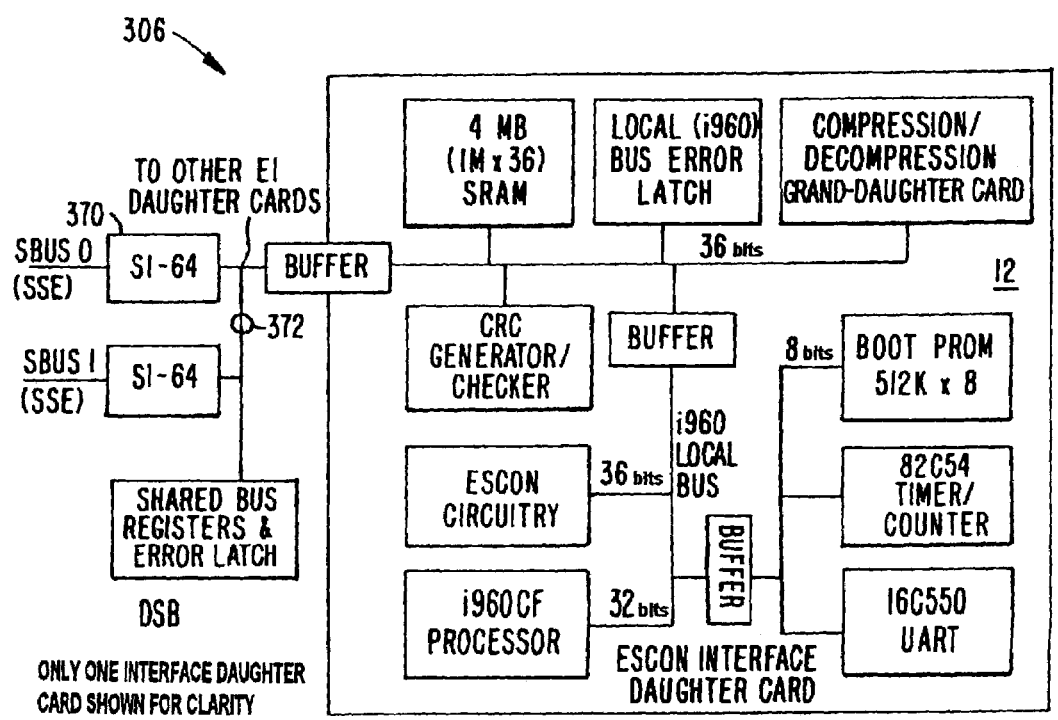
FIG. 4 is a block diagram of a DSB board and an ESCON Interface daughter card.

FIG. 4 is a simplified block diagram of the DSB and CIF daughter cards shown in FIG. 3. A DSB 306 plugs into a slot in the chassis, and therefore connects to two SSEs 360, which are referred to as SBus0 and SBus1. The are two SI64 bridge chips on the DSB, one for each SBus.

The SI64s 370 are connected to the [up to] four interface daughter cards on the DSB via a common i960-compatible bus 372. Also included on the DSB are some shared control/status/interrupt support registers used for communication between the SPARC and the i960s.

Thus, each DSB card 306 contains two SI-64's, one for connection to each of two SPARC SBuses. On the i960 side, the two SI-64's connect to a common bus. Each EI (Escon Interface which contains an i960) board 12 carried by the DSB 306 has access to this common bus according to a scheme of arbitration supported by a small amount of DSB logic. This connection uses a set of transceivers to link temporarily an i960's local bus and the common bus 372, which have the same design. Thus, each i960 can access and use either SI-64.

The SI-64 is a Motorola product which operates as a "gateway" between the main bus of an i960 (call this the "local" bus) and the I/O bus (specifically SBus) of a SPARC machine. It can be programmed to perform direct memory access (DMA) transfers between memories of the two computers. It is therefore able to arbitrate accesses to each kind of bus and has address and length counters to effect one transfer at a time. Without using the DMA feature, the chip allows an i960 program to read from or write to an arbitrary SPARC memory location and allows a SPARC program to read from or write to an arbitrary i960 memory location.

The SPARC system utilizes virtual addresses, which are translated into physical addresses on the SBus, for devices on the SBUS.

Access to the interface cards from the SBus (SPARC) is accomplished by dividing twenty-eight bit physical addresses allotted to the chassis ("SBus Slot") into four equal 64 MByte areas that select one of the four DSB boards in the chassis. The 64 MByte area of each DSB board is sub-divided into four areas of 16 MB which select one of the interface daughter cards 12. The 16 MB area assigned to each interface card is further sub-divided into an 8 MB area that allows direct access into the interface card. The remaining 8 MB area is mapped into a common area that allows access to shared resources on the DSB such as dual-ported RAM, bridge registers, interrupt status, etc.

Figure 5:
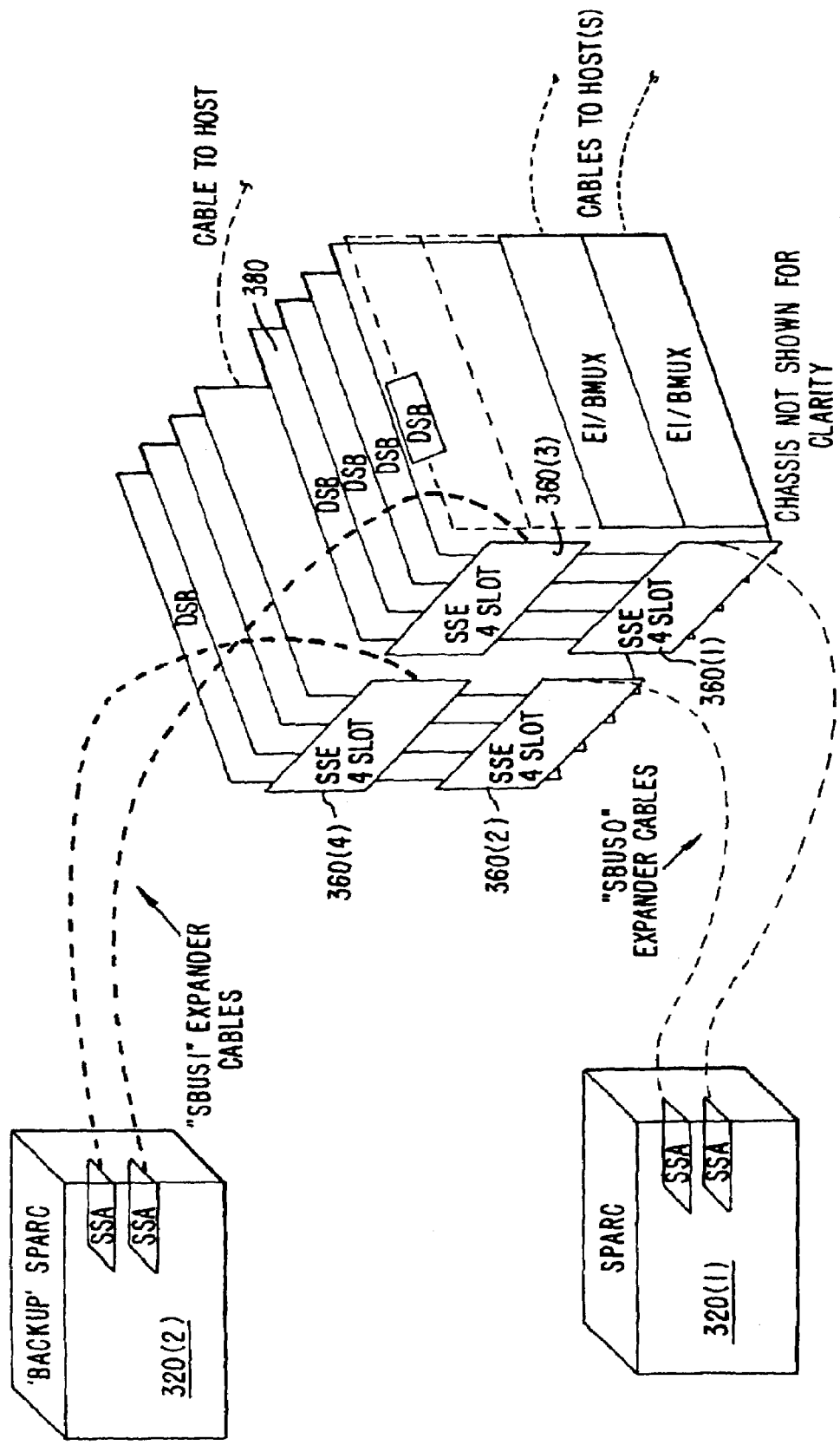
FIG. 5 is a perspective view of the channel interface hardware coupled to primary and alternate main processors.

As depicted in FIG. 5, redundancy is provided by connecting a backup main processor 320(2) to a third SSE 360(3), coupled to the same DSBs 380 as the first SSE 360(1). Thus, it is possible for the backup main processor 320(2) to take over the functions of the primary main processor 320(1) in the event of a failure.

Figure 6:
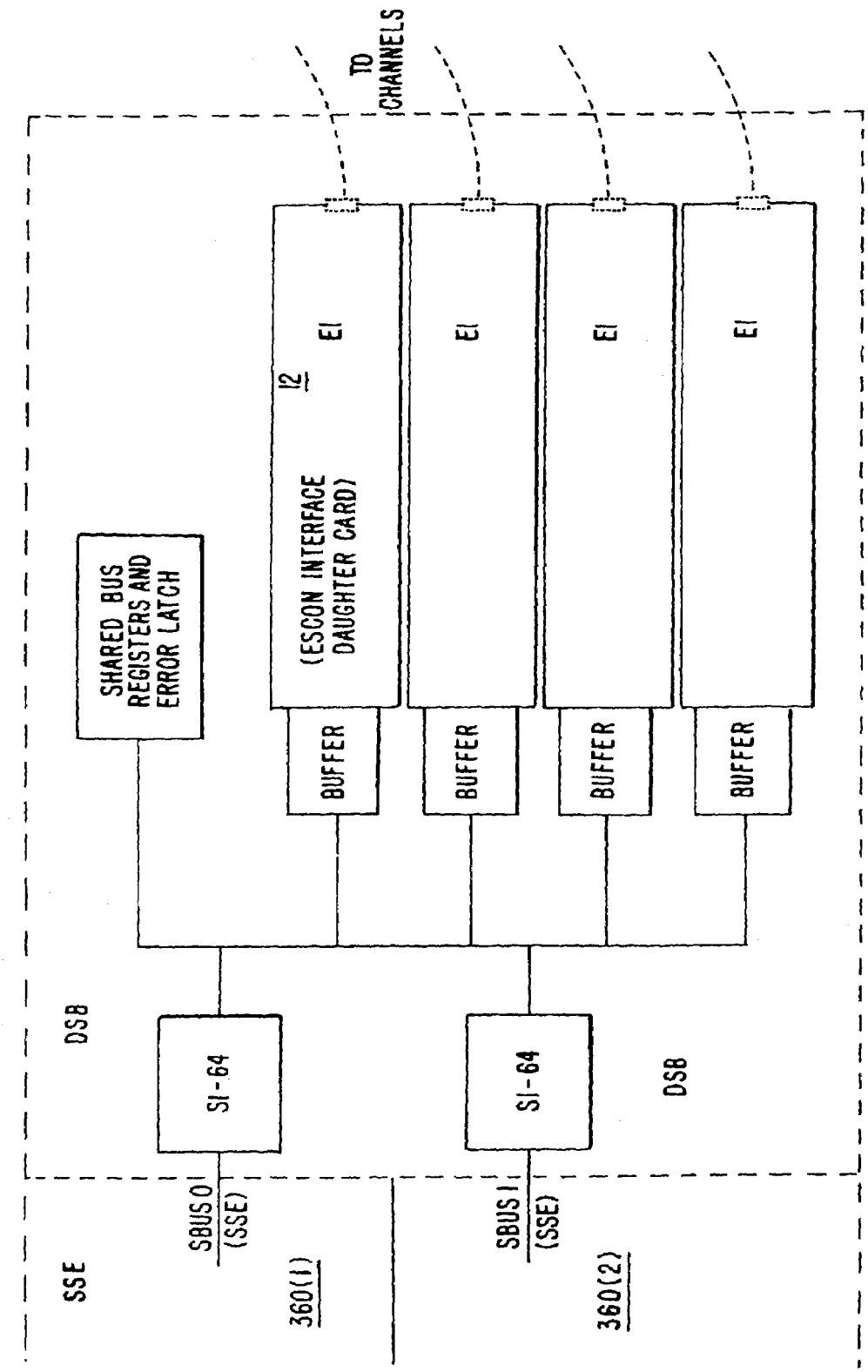
FIG. 6 is a block diagram depicting redundant connections to the CIFs.

The redundant connection the Sbuses of the primary and backup main processors is depicted in FIG. 6. Each DSB contains up to four CIFs 12 (in this figure designated ESCON Interface Daughter Cards (EIs)).

The invention has now been described with reference to the preferred embodiments. Alternatives and substitutions will now be apparent to persons of skill in the art. For example, particular products such a SPARC processor and SI64 interface chips have been described. Other products may be substituted. Accordingly, it is not intended to limit the invention, except as provided by the appended claims.

What is claimed is:

1. A method of interfacing a library management system software module to a virtual tape drive server module with the library management system software module resident on a host computer running an operating system (OS) and applications, where the OS provides services for inputting and outputting data sets to physical tape drives, with the services including channel commands for outputting tape mounting requests and for reading a tape, with the virtual tape drive server for receiving commands from the host to store and retrieve data from non-physical virtual tape volumes, and with the virtual tape drive server module for storing metadata describing the actual storage of the virtual tape volume contents, and with the library management system software module generating requests to cause the OS to issue messages and commands to the virtual tape drive server module to make the virtual tape drive server module status information available to the library management system software module, said method comprising:

establishing a naming convention to identify differently named administrative virtual volumes for providing different types of status information;

determining that the library management system software module requires updating of a designated type of status information;

generating, with the library management system software module, a mount request including a designated name of the administrative volume that provides the designated type of configuration metadata;

responding, at the virtual tape drive server module, to said mount request to retrieve said designated type of status information and build an administrative data set including the designated type of status information, storing said data set in a virtual tape volume, and mounting the volume on a specified virtual tape drive;

generating, with the library management system software module and the OS, read commands to the said virtual tape drive;

responding, at the virtual tape drive server module, to said read commands to transfer said administrative data set to the host for use by the library system software module.

2. A method of communicating, in real-time, policy and control messages, indicating attributes such as the performance class, media class, or storage class of a virtual volume, between a library system software module and a virtual tape drive server module, with the library system software module resident on a host computer running an operating system (OS) and applications, where the OS provides services for inputting and outputting data sets to physical tape drives, with the services including channel commands for transmitting display messages to tape drives, with the virtual tape drive server for receiving said messages and interpreting them as requests from the library management system software module to mount non-physical virtual tapes, create non-physical virtual tape volumes, and other control purposes, and with the virtual tape drive server module requiring policy and control information when creating, mounting or disposing of a virtual tape volume relating to user choices concerning virtual storage, and with requests to cause the OS to issue commands transmitting messages to the virtual tape drive server module conveying the needed policy and control information, and with the host computer including a load display interface for transmitting messages to be displayed on a display pod of a tape drive, said method comprising:

> generating, using an application, a request to the OS to mount a tape volume in which to store data;
>
> intercepting, with the library management system software module, said mount request;
>
> building, with the library management system software module, a load display interface message in load display interface format for transmitting to the virtual tape drive server module over the load display interface channel, with said message including an identification parameter identifying eligible virtual volumes and including parameters specifying user-selected policy information relating to the selected virtual volume to be mounted;
>
> transmitting said load display interface message to said virtual tape drive server module utilizing the load display interface channel;
>
> responding, at said virtual tape drive server module, to said load display interface message to select a virtual volume from among the specified eligible volumes and mount said selected virtual volume and set policy parameters of said selected virtual volume equal to the policy parameters identified in said load display interface message.

3. The method of claim 2 further comprising:

determining at said virtual tape drive server module that an error condition exists;

including a field in said load display interface message identifying said message as a health check;

if an error condition, reporting an error condition to the OS when the health check message is received.

4. A tape drive emulation interface, connecting a plurality of host channels to a main processor having a systembus of a tape drive emulation system, said interface comprising:

a plurality of dual systembus base boards;

a plurality of channel interfaces disposed on each dual systembus base board, each channel interface for interfacing a host channel to input/output buffers of the main processor;

a first bus expander, multiplexing said plurality of dual systembus base boards to a bus expander port;

a first set of signal lines coupling said bus expander port to said main processor systembus.

5. The interface of claim 4 further comprising:

a backup main processor having a systembus;

a second bus expander, multiplexing said plurality of dual systembus base boards to a second bus expander port;

a second set of signal lines coupling said second bus expander port to the systembus of said backup main processor.

6. A method for transferring status information, relating to virtual volumes in a tape drive emulation system, from the virtual tape drive server to a host computer, said method comprising the steps of:

transmitting a request for status information from the host computer to the virtual tape drive server;

in response to said request, building and mounting an administrative virtual volume at said virtual tape drive server to store requested status information;

reading said administrative virtual volume to transfer said requested status information from said administrative virtual volume to said host computer.

7. A method for updating status information, relating to virtual volumes in a tape drive emulation system, from a host computer to the virtual tape drive server, said method comprising the steps of:

transmitting a request to update status information from the host computer to the virtual tape drive server;

in response to said request, mounting an administrative virtual volume at said virtual tape drive server to store updated status information;

writing to said administrative virtual volume to transfer said updated status information to said administrative virtual volume from said host computer;

reading said updated information from said administrative virtual volume to update status information at said virtual tape drive server.

* * * * *